US012587307B2

(12) United States Patent     (10) Patent No.:   US 12,587,307 B2

Nazari et al.     (45) Date of Patent:    Mar. 24, 2026

(54) METHODS AND ARRANGEMENTS FOR DETERMINING PARAMETERS OF BURSTS FOR DATA FLOW TRANSMISSION IN A WIRELESS COMMUNICATION NETWORK BASED ON CHANNEL QUALITY

(71) Applicant: Telefonaktiebolaget LM Ericsson (publ), Stockholm (SE)

(72) Inventors: Ala Nazari, Handen (SE); John Orre, Saltsjöbaden (SE); Marcus Ihlar, Älvsjö (SE); Robert Skog, Hässelby (SE)

(73) Assignee: Telefonaktiebolaget LM Ericsson, Stockholm (SE)

( * ) Notice: Subject to any disclaimer, the term of this patent is extended or adjusted under 35 U.S.C. 154(b) by 848 days.

(21) Appl. No.: 17/597,299

(22) PCT Filed: Jul. 10, 2019

(86) PCT No.: PCT/SE2019/050684

§ 371 (c)(1),
(2) Date: Dec. 30, 2021

(87) PCT Pub. No.: WO2021/006781

PCT Pub. Date: Jan. 14, 2021

(65) Prior Publication Data

US 2022/0321251 A1     Oct. 6, 2022

(51) Int. Cl.
   *H04L 1/00*       (2006.01)
   *H04L 47/11*     (2022.01)
           (Continued)

(52) U.S. Cl.
   CPC ............ *H04L 1/0026* (2013.01); *H04L 47/11* (2013.01); *H04L 47/22* (2013.01); *H04W 28/0231* (2013.01)

(58) Field of Classification Search
   CPC .......... H04W 52/0229; H04W 52/0235; H04B 11/00; G06F 3/167; G06F 9/4418;
           (Continued)

(56) References Cited

U.S. PATENT DOCUMENTS

| 9,961,586 B2 | 5/2018 | Won et al. |
| 2010/0167773 A1* | 7/2010 | Oota ..................... H04L 1/0026 |
| | | 455/517 |

(Continued)

FOREIGN PATENT DOCUMENTS

WO     02052869 A2    7/2002

OTHER PUBLICATIONS

Communication pursuant to Article 94(3) EPC, EP App. No. 19742089.6, Jun. 30, 2023, 6 pages.

(Continued)

*Primary Examiner* — Jay P Patel
*Assistant Examiner* — Shehab A Alawdi
(74) *Attorney, Agent, or Firm* — Nicholson De Vos Webster & Elliott LLP

(57) ABSTRACT

Transmission of a data flow in bursts for transport in a wireless communication network towards a wireless device served by a radio network node of said wireless communication network. Device(s) obtains a communication quality indicator indicating communication quality between the radio network node and the wireless device, which communication quality is relevant for provision of the data flow to the wireless device. Said device(s) initiates provision of said data flow to the wireless device with said bursts based on the obtained communication quality indicator.

17 Claims, 5 Drawing Sheets

701

503

702

102; 112; 130;
131; 500

(51) Int. Cl.
   *H04L 47/22*       (2022.01)
   *H04W 28/02*      (2009.01)
(58) Field of Classification Search
   CPC ......... Y02D 30/70; G10L 15/22; G10L 15/02;
                                G10L 2015/223
   See application file for complete search history.

(56) References Cited

U.S. PATENT DOCUMENTS

| | | | | |
|---|---|---|---|---|
| 2011/0002280 | A1* | 1/2011 | Davydov | H04L 5/0023 |
| | | | | 375/267 |
| 2012/0164948 | A1* | 6/2012 | Narasimha | H04W 72/1215 |
| | | | | 455/63.1 |
| 2014/0301231 | A1* | 10/2014 | Hooli | H04W 24/08 |
| | | | | 370/252 |
| 2015/0146552 | A1 | 5/2015 | Majmundar et al. | |
| 2015/0215097 | A1* | 7/2015 | Yi | H04L 5/001 |
| | | | | 370/329 |
| 2016/0112168 | A1* | 4/2016 | Yoo | H04B 7/2656 |
| | | | | 370/280 |
| 2018/0132269 | A1* | 5/2018 | Wang | H04W 52/36 |
| 2019/0021102 | A1* | 1/2019 | Wang | H04L 1/1671 |
| 2019/0215194 | A1* | 7/2019 | Song | H04L 5/0048 |
| 2019/0281587 | A1* | 9/2019 | Zhang | H04W 72/23 |
| 2020/0112876 | A1* | 4/2020 | Sridhar | H04W 28/0226 |
| 2020/0304259 | A1* | 9/2020 | Ihalainen | H04L 5/0051 |

OTHER PUBLICATIONS

International Preliminary Report on Patentability, PCT App. No. PCT/SE2019/050684, Jan. 20, 2022, 9 pages.

Nokia, "Functions and Entities in Evolved Packet Core", Aug. 23-25, 2006, 6 pages, 3GPP TSG SA WG2 Architecture—SAE Ad-Hoc, S2-062866, Sophia Antipolis, France.

International Search Report and Written Opinion for Application No. PCT/SE2019/050684, Mar. 23, 2020, 12 pages.

Johannes Hund et al., "A packet-level adaptive forward error correction scheme for wireless networks", 2010, 3 pages, 2010 7th Workshop on Positioning, Navigation and Communication, IEEE.

3GPP TS 36.213 V15.6.0, "3rd Generation Partnership Project; Technical Specification Group Radio Access Network; Evolved Universal Terrestrial Radio Access (E-UTRA); Physical layer procedures (Release 15)," Jun. 2019, 551 pages, 3GPP Organizational Partners.

\* cited by examiner

10

EXAMPLE 1

EXAMPLE 2

Start

401 Obtain communication quality indicator indicating communication quality between radio network node and wireless device.

402 Initiate provision of data flow to the wireless device with said bursts based on the obtained communication quality indicator.

End

500 Device(s)

501 Processing module

502 Memory

503

504 Processor(s)

505 I/O module

METHODS AND ARRANGEMENTS FOR DETERMINING PARAMETERS OF BURSTS FOR DATA FLOW TRANSMISSION IN A WIRELESS COMMUNICATION NETWORK BASED ON CHANNEL QUALITY

CROSS-REFERENCE TO RELATED APPLICATIONS

This application is a National stage of International Application No. PCT/SE2019/050684, filed Jul. 10, 2019, which is hereby incorporated by reference.

TECHNICAL FIELD

Embodiments herein concern a method and arrangements relating to transmission of a data flow in bursts for transport in a wireless communication network, e.g. a telecommunication network, towards a wireless device served by a radio network node of said wireless communication network.

BACKGROUND

Communication devices such as wireless communication devices, that simply may be named wireless devices, may also be known as e.g. user equipments (UEs), mobile terminals, wireless terminals and/or mobile stations. A wireless device is enabled to communicate wirelessly in a wireless communication network, wireless communication system, or radio communication system, e.g. a telecommunication network, sometimes also referred to as a cellular radio system, cellular network or cellular communication system. The communication may be performed e.g. between two wireless devices, between a wireless device and a regular telephone and/or between a wireless device and a server via a Radio Access Network (RAN) and possibly one or more core networks, comprised within the cellular communication network. The wireless device may further be referred to as a mobile telephone, cellular telephone, laptop, Personal Digital Assistant (PDA), tablet computer, just to mention some further examples. Wireless devices may be so called Machine to Machine (M2M) devices or Machine Type of Communication (MTC) devices, i.e. devices that are not associated with a conventional user.

The wireless device may be, for example, portable, pocket-storable, hand-held, computer-comprised, or vehicle-mounted mobile device, enabled to communicate voice and/or data, via the RAN, with another entity, such as another wireless device or a server.

The wireless communication network may cover a geographical area which is divided into cell areas, wherein each cell area is served by at least one base station, or Base Station (BS), e.g. a Radio Base Station (RBS), which sometimes may be referred to as e.g. "eNB", "eNodeB", "NodeB", "B node", or BTS (Base Transceiver Station), depending on the technology and terminology used. The base stations may be of different classes such as e.g. macro eNodeB, home eNodeB or pico base station, based on transmission power and thereby also cell size. A cell is typically identified by one or more cell identities. The base station at a base station site may provide radio coverage for one or more cells. A cell is thus typically associated with a geographical area where radio coverage for that cell is provided by the base station at the base station site. Cells may overlap so that several cells cover the same geographical area. By the base station providing or serving a cell is typically meant that the base station provides radio coverage such that one or more wireless devices located in the geographical area where the radio coverage is provided may be served by the base station in said cell. When a wireless device is said to be served in or by a cell this implies that the wireless device is served by the base station providing radio coverage for the cell. One base station may serve one or several cells. Further, each base station may support one or several communication technologies. The base stations communicate over the air interface operating on radio frequencies with the wireless device within range of the base stations.

In some RANs, several base stations may be connected, e.g. by landlines or microwave, to a radio network controller, e.g. a Radio Network Controller (RNC) in Universal Mobile Telecommunication System (UMTS), and/or to each other. The radio network controller, also sometimes termed a Base Station Controller (BSC) e.g. in GSM, may supervise and coordinate various activities of the plural base stations connected thereto. GSM is an abbreviation for Global System for Mobile Communication (originally: Groupe Spécial Mobile), which may be referred to as 2nd generation or 2G.

UMTS is a third generation mobile communication system, which may be referred to as 3rd generation or 3G, and which evolved from the GSM, and provides improved mobile communication services based on Wideband Code Division Multiple Access (WCDMA) access technology. UMTS Terrestrial Radio Access Network (UTRAN) is essentially a radio access network using wideband code division multiple access for wireless devices. High Speed Packet Access (HSPA) is an amalgamation of two mobile telephony protocols, High Speed Downlink Packet Access (HSDPA) and High Speed Uplink Packet Access (HSUPA), defined by 3GPP, that extends and improves the performance of existing 3rd generation mobile telecommunication networks utilizing the WCDMA. Such networks may be named WCDMA/HSPA.

The expression downlink (DL) may be used for the transmission path from the base station to the wireless device. The expression uplink (UL) may be used for the transmission path in the opposite direction i.e. from wireless device to the base station.

In 3rd Generation Partnership Project (3GPP) Long Term Evolution (LTE), base stations, which may be referred to as eNodeBs or eNBs, may be directly connected to other base stations and may be directly connected to one or more core networks. LTE may be referred to as 4th generation or 4G.

The 3GPP has undertaken to evolve further the UTRAN and GSM based radio access network technologies, for example into evolved UTRAN (E-UTRAN) used in LTE.

Work is ongoing with developing a next generation wide area networks, which may be referred to as NeXt generation (NX), New Radio (NR), or fifth generation (5G).

Mobile operators, i.e. operators of wireless communication networks as above, typically apply traffic shaping in the core network for various reasons. A common type of shaping is known as Adaptive Bitrate (ABR) shaping and is applied to data flows, in particular video flows, to reduce the volume consumed by the video flow. The traffic shaping is performed in a core network node such as the PGW, a TDF node or some other core network node node with GI function.

A common consequence of traffic shaping in the core network is that data, e.g. a data flow, is delivered to the RAN in very small bursts that have negative consequences on common throughput Key Performance Indicators (KPIs) and potentially leads to somewhat reduced efficiency. This can be mitigated by sending shaped data in the form of a set of larger bursts interleaved by periods of quiescence, i.e. silence. The data is thus split into data bursts, i.e. parts of data that are sent separated in time with no parts of the data sent between, i.e. silence or quiescent periods where the data is not transmitted at all. In the silence periods other data may be sent instead. Shaping of this kind is referred to as Radio Friendly Shaping (RFS).

In common services for traffic shaping, video streams are shaped to e.g. 1.5 Mbit/s and it is find out, via RTT measurements, if the cell in use is congested. If the cell is congested, the shaping level is reduced, e.g. set to 1.2 Mbit/s, or if the cell congestion is heavy, the shaping level is even further reduced, e.g. set to 0.9 Mbit/s. This kind of "congestion aware" shaping is then combined with RFS, where burst sizes and the quiescence periods are determined by the shaping level, i.e. said shaping level that was set based on congestion level.

SUMMARY

In view of the above, an object is to provide one or more improvements in relation to the prior art, in particular to provide improvements regarding transmission of a data flow in bursts for further transport in a wireless communication network, e.g. a telecommunication network, towards a wireless device served by a radio network node of said wireless communication network.

According to a first aspect of embodiments herein, the object is achieved by a method, performed by one or more devices, relating to transmission of a data flow in bursts for transport in a wireless communication network towards a wireless device served by a radio network node of said wireless communication network. Said one or more devices being communicatively connected to the wireless communication network. The one or more devices obtain a communication quality indicator indicating communication quality between the radio network node and the wireless device. The communication quality being relevant for provision of the data flow to the wireless device. Further, the one or more devices initiate provision of said data flow to the wireless device with said bursts based on the obtained communication quality indicator.

According to a second aspect of embodiments herein, the object is achieved by a computer program comprising instructions that when executed by a processing circuit causes said one or more devices to perform the method according to the first aspect.

According to a third aspect of embodiments herein, the object is achieved by a carrier comprising the computer program according to the second aspect.

According to a fourth aspect of embodiments herein, the object is achieved by one or more devices relating to transmission of a data flow in bursts for transport in a wireless communication network towards a wireless device served by a radio network node of said wireless communication network. Said one or more devices being configured to be communicatively connected to the wireless communication network. The one or more devices are further configured to obtain a communication quality indicator indicating communication quality between the radio network node and the wireless device. The communication quality being relevant for provision of the data flow to the wireless device. Further, the one or more devices are configured to initiate provision of said data flow to the wireless device with said bursts based on the obtained communication quality indicator.

According to a fifth aspect of embodiments herein, the object is achieved by a method, performed by one or more data providing devices, relating to transmission of a data flow towards a wireless device. The one or more data providing devices provide data to be transported by the data flow and initiate transmission of the data flow comprising the provided data, towards the wireless device via a wireless communication network to which one or more further devices are communicatively connected. Said one or more further devices relating to transmission of the data flow in bursts for transport in the wireless communication network towards the wireless device that is served by a radio network node of said wireless communication network. Said one or more further devices being configured to obtain a communication quality indicator indicating communication quality between the radio network node and the wireless device, which communication quality is relevant for provision of the data flow to the wireless device, and are configured to initiate provision of said data flow to the wireless device with said bursts based on the obtained communication quality indicator.

Thanks to embodiments herein, bursts may be tuned better and efficiency increase. By being based on the communication quality indicator, e.g. a Channel Quality Indicator (CQI), the bursts can be adapted to take radio conditions for individual wireless devices into account, in contrast to conventional RFS where bursts use a common burst size for wireless devices at different communication quality, e.g. radio, conditions. If this is combined with congestion aware traffic shaping, it is enabled further and even vast efficiency gains, particularly in heavily loaded cells.

The improved efficiency mean better utilized resources for delivering data flows, in particular e.g. video data, resulting in that more users can be delivered such data and/or at better quality. It will e.g. be possible to deliver higher quality video streaming services to users connected via wireless communication networks.

BRIEF DESCRIPTION OF THE DRAWINGS

Examples of embodiments herein are described in more detail with reference to the appended schematic drawings, which are briefly described in the following.

DETAILED DESCRIPTION

Figure 1:
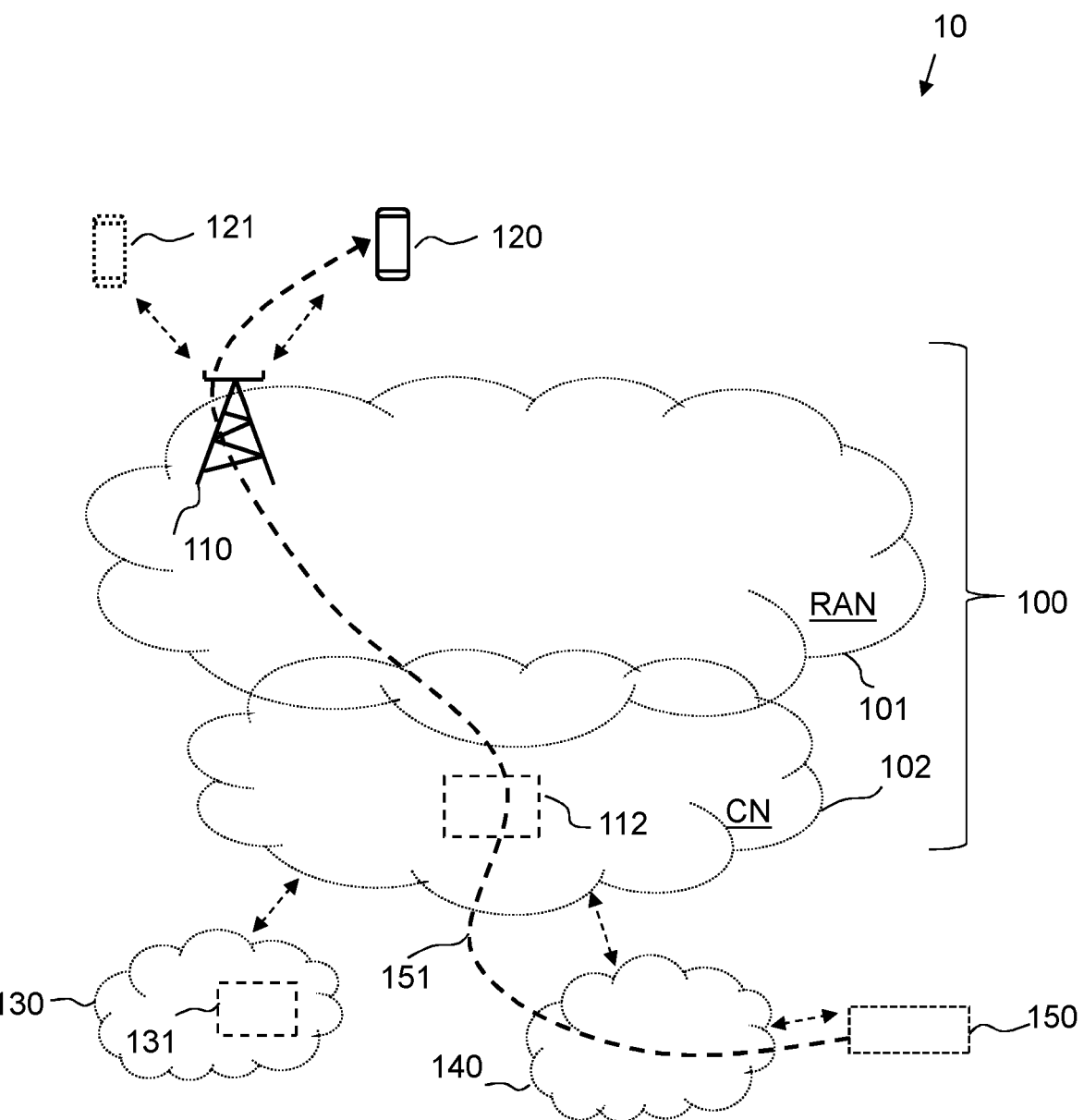
FIG. 1 is a block diagram schematically depicting an example of a communication system to be used for discussing embodiments herein and in which embodiments herein may be implemented.

Throughout the following description similar reference numerals may be used to denote similar elements, units, modules, circuits, nodes, parts, items or features, when applicable. Features that appear only in some embodiments of what is shown in a figure, are typically indicated by dashed lines in the drawings.

Embodiments herein are illustrated by exemplary embodiments. It should be noted that these embodiments are not necessarily mutually exclusive. Components from one embodiment may be tacitly assumed to be present in another embodiment and it will be obvious to a person skilled in the art how those components may be used in the other exemplary embodiments.

As a development towards embodiments herein, the situation indicated in the Background will first be further elaborated upon.

The Channel Quality Indicator (CQI) will be briefly explained since it will used in examples that follow. CQI may be described as an indicator carrying information on how good/bad the communication channel quality is, typically for a wireless device. CQI is typically information that a wireless device sends to the wireless communication network, or specifically to a radio network node thereof, such as an eNB. Practically it typically implies or has any one of the following meanings, which may be determined by the context of use:

i) That the current communication channel quality is according to the CQI, i.e. an indication of the current communication channel quality for the wireless device transmitting the CQI. The CQI reported by the wireless device may e.g. indicate the transport block size the wireless device can receive at a given modulation scheme with an error-probability less than 0.1.

ii) That the wireless device wants to receive data according to the CQI, e.g. a certain transport block size, which in turn can be directly converted into throughput.

TABLE 1

| | Example of CQI table | | |
| --- | --- | --- | --- |
| CQI index | modulation | code rate x 1024 | efficiency |
| 0 | | out of range | |
| 1 | QPSK | 78 | 0.1523 |
| 2 | QPSK | 120 | 0.2344 |
| 3 | QPSK | 193 | 0.3770 |
| 4 | QPSK | 308 | 0.6016 |
| 5 | QPSK | 449 | 0.8770 |
| 6 | QPSK | 602 | 1.1758 |
| 7 | 16QAM | 378 | 1.4766 |
| 8 | 16QAM | 490 | 1.9141 |
| 9 | 16QAM | 616 | 2.4063 |
| 10 | 64QAM | 466 | 2.7305 |
| 11 | 64QAM | 567 | 3.3223 |
| 12 | 64QAM | 666 | 3.9023 |
| 13 | 64QAM | 772 | 4.5234 |
| 14 | 64QAM | 873 | 5.1152 |
| 15 | 64QAM | 948 | 5.5547 |

Table 1 is only an example and corresponds to Table 7.2.3-1 in 3GPP TS 36.213 V15.6.0, chapter 7.2.3 "Channel Quality Indicator (CQI) definition". Note that a CQI table may look different in other contexts. There are e.g. CQI tables as above reaching up to 256QAM. The modulation scheme determines the effective transport block size that can be used for transmission. This is determined by the code rate, for example, at CQI 15 the code rate in the shown table is 948/1024=0.925, and at CQI 1 the code rate is 78/104=0.07.

To put it simple, CQI indicates radio conditions and/or quality of a radio environment for the wireless device, i.e. a communication quality or condition that the wireless device is subject to for communication with the wireless communication network via radio network node thereof. Higher CQI indicates a better radio environment and communication quality for the wireless device, which leads to higher possible throughput to the wireless device, i.e. that it is possible to deliver data to the wireless device at higher data rate.

The conventional Radio Friendly Shaping (RFS) as described in the Background does not consider the network conditions of the wireless device(s) that is recipient of the data when determining the sizes of the bursts that are used to deliver the data. This can be problematic for several reasons. For wireless devices at poor radio conditions, e.g. CQI<7, i.e. at poor communication conditions for communicating with a radio node of the wireless communication network, an instantaneous burst that is "too large" can cause unnecessary buffer utilization in a communication bottleneck, typically associated with a node of the wireless communication network that the data flow passes through, such as the radio network node, e.g. base station, such as eNodeB, serving the wireless device. This in turn may trigger so called Active Queue Management (AQM) discards or buffer overflow. On the other hand, some wireless devices, e.g. served by the same radio network node, may at the same time be in very good radio conditions, e.g. CQI>10. These may with conventional shaping therefore receive bursts that are "to small", i.e. not large enough to have a desirable impact of RFS. That is, from perspective of the latter, i.e. "good condition" wireless devices, it would be desirable with larger bursts but at the same time, for the "poor condition" wireless devices, it would be desirable with smaller bursts. This results in suboptimal traffic shaping and forming of the bursts, where a configured burst size corresponding to a shaping level must be selected so that it causes the least problems on both ends of the spectrum irrespective of the radio conditions of individual wireless devices, i.e. there is a tradeoff. This tradeoff leads to suboptimal performance on at both ends, i.e. both for the "good condition" and "bad condition" wireless devices.

Further, a first wireless device that is in good radio condition and uses for example 256QAM modulation could be able to handle a bigger burst, e.g. using higher bandwidth and more data in each burst for transmitting video than a second wireless device served in e.g. the same cell by the same radio network node. After the radio network node has been expediting that burst to the first wireless device, i.e. during a silent period until a next burst is to be expedited to the first wireless device, the radio network node could instead use available resources for transmitting to another wireless device, e.g. the second wireless device.

However, conventionally, all wireless devices in a congested cell are treated equal regarding traffic shaping and it is e.g. the load of the cell that determines the traffic shaping. For example, a conventional video optimizer service typically uses Round Trip Time (RTT) measurements to find out if a wireless device is in a congested cell, but is not able to distinguish between different wireless devices in the congested cell.

Embodiments herein are based on realization of the above and that resources could be more efficiently utilized if e.g. traffic shaping would take also radio condition of the wireless device into account, or more generally, take into account the communication quality associated with the current ability of the wireless device to receive transmission from the radio network node that serves it.

Practically, this may be accomplished by letting the radio network node, e.g. eNB, send the CQI or corresponding information, that it e.g. receives from the wireless device, to a network node, typically a core network node, that performs traffic shaping, e.g. a Traffic Detection function (TDF) node and/or a Packet data GateWay (PGW) node, and make the traffic shaping regarding that wireless device also be based on the CQI. An existing, such as conventional traffic shaping as mentioned above, may be adapted based on the CQI, i.e. the bursts be adapted based on the CQI. Hence, an existing traffic shaping function could be controlled to take into account also CQI, which facilitates implementation.

Thanks to this and embodiments herein, improved RFS is enabled, i.e. through communication and/or channel quality awareness. Burst sizes may be tuned for optimal efficiency gains. This enhances the conventional RFS solution with bursts that is based on a common burst size for wireless devices at different radio and communication conditions. When this improved RFS is combined also with congestion aware traffic shaping, vast efficiency gains, particularly in heavily loaded cells, is expected.

FIG. 1 is a block diagram schematically depicting an example of a communication system 10 to be used for discussing embodiments herein in some detail and in which embodiments herein may be implemented. The communication system 10 comprises a wireless communication network 100, e.g. a telecommunication network. The wireless communication network 100 may comprise a Radio Access Network (RAN) 211 part and a core network (CN) 102 part. The wireless communication network 100 is typically a telecommunication network or system, such as a cellular communication network that supports at least one Radio Access Technology (RAT), e.g. LTE, or 4G, New Radio (NR) that also may be referred to as 5G.

The wireless communication network 100 comprises network nodes that are communicatively interconnected. The network nodes may be logical and/or physical and are located in one or more physical devices. The wireless communication network 100, typically the RAN 201, comprises a radio network node 110, i.e. a network node being or comprising a radio transmitting network node, such as base station, and/or that are being or comprising a controlling node that controls one or more radio transmitting network nodes. Said radio network node may e.g. be communicatively connected, such as configured to communicate, over, or via, a so called X2-U communication interface or communication link with other radio network nodes (not shown) comprised in the RAN.

Further, the wireless communication network 100, or rather the CN 102 typically comprises one or more core network nodes, e.g. a core network node 112, such as a PGW and/or TDF node and/or User Plane Function (UPF) node, that may be communicatively connected, such as configured to communicate, over, or via, a communication interface or communication link, such as the so called so called S1-U, with radio network nodes of the RAN 101, e.g. with the radio network node 110.

S1-U, X2-U are IP/UDP based and are examples of user plane protocols used in e.g. LTE and NR wireless communication networks. These user plane protocols can be considered to correspond to application layer protocols in terms of a IP network in general and may be involved in transport of data flows to users. For example, the radio network node 210 may be communicatively connected, e.g. via X2-U, to another radio network node in an IP network part of the RAN 201. Moreover, the network node 110 may be communicatively connected, e.g. via S1-U, to the core network node 212.

The wireless communication network 100, or specifically one or more network nodes thereof, e.g. the network node 110, is typically configured to serve and/or control and/or manage one or more wireless communication devices, such as a wireless device 120 and a wireless device 121, in radio coverage areas, i.e. an area where radio coverage is provided for communication with one or more communication devices. The wireless device 220 may be alternatively be named a wireless communication device, UE etc. as explained elsewhere herein. Each radio coverage may be provided by and/or associated with a particular Radio Access Technology (RAT). The radio coverage may be radio coverage of a radio beam, that simply may be named a beam. As should be recognized by the skilled person, a beam is a more dynamic and relatively narrow and directional radio coverage compared to a conventional cell, and may be accomplished by so called beamforming. A beam is typically for serving one or a few wireless devices at the same time, and may be specifically set up for serving this one or few wireless devices. The beam may be changed dynamically by beamforming to provide desirable coverage for the one or more wireless devices being served by the beam. There may be more than one beam provided by one and the same network node.

In the figure it is also shown a remote device 131, e.g. remote network node, and a remote computer network 130 that the remote device 131 may be part of or connected to. The remote computer network 130 may correspond to a so called computer cloud, or simply cloud, providing certain services. The remote device 131 and/or remote network 130 may e.g. be communicatively connected to the wireless communication network 100, e.g. to one or more devices and/or nodes thereof, such as the CN 101 and core network node 112.

The wireless communication network 100, e.g. the CN 102 thereof, may further be communicatively connected to, e.g. via the core network node 112, and thereby e.g. provide access for said wireless communication device 120, to an external network 140, e.g. the Internet. The external network 140 comprise and are connected to further network nodes, e.g. an external network node, such as corresponding to one or more data providing devices, such data providing device(s) 150, for providing data to wireless devices, e.g. in the form of a data flow to the wireless device 120. External here refers to external vs. the wireless communication network 100. The data providing device(s) may e.g. correspond to server device(s) providing service(s), e.g. as part of a service providing computer cloud, to one or more other Internet connected devices, e.g. the wireless device 120 that may be provided with access to the external network 140, such as the Internet, via the wireless communication network 100, e.g. via the core network node 120 as mentioned above. Such server device(s), or simply server(s), may alternatively be termed e.g. host computer(s), a server system etc. In any case, the wireless device 120 may thus e.g. be communicatively connected, such as by means of TCP/UDP/IP and an application layer or user plane protocol, via the wireless communication network 100 and the external network 140, with the data providing device(s) 150. A data flow 151, as indicated in the figure by a dotted line, may e.g. be provided by the data providing device(s) 150, via the external network 140 and the wireless communication network 100, to the wireless device 220. The data providing device(s) 150 may e.g. be a server providing a video streaming service accessed via an application, or app, executing on the communication device 120 and the data flow 151 be associated with that, e.g. be a video data flow provided to the wireless device 120. It may be noted that server(s), e.g. a device(s) and/or network node(s), corresponding to the data providing device(s) 150, in practice may correspond to one or more physical nodes or devices, e.g. associated with a service through or from which the data flow 151 is provided.

The wireless communication network 100 is an example of a multi-access communication network, i.e. a communication network that provides access to, e.g. serves, multiple client devices, here wireless devices, such as wireless devices 120, 121. This is here accomplished by offering the wireless devices connections and communication to/from and/or via wireless communication network 100 typically through one or more resources of the wireless communication network 100 that are shared by many wireless communication devices. Each such resource may thus be shared by multiple wireless devices. For example, the wireless device 120 may receive the data flow 151 through a resource of the wireless communication network 100, e.g. of the radio network node 110, that is also used by the wireless communication network 100 to deliver data to the wireless device 121, which resource thus is shared between the wireless devices 120-121. For example when the radio network node 110 serves wireless devices 120-121 in a cell and that cell become what is referred to as congested, it is typically such a shared resource that has become overloaded. Congestion can be considered to result from bandwidth limitations. In general, such shared resource(s) may be of different kind and differently located depending on the type of wireless communication network, RAT, etc, but may e.g. pertain to a network node that multiple wireless devices connect to or via when accessing the wireless communication network 100, e.g. for communication of data to/from the wireless communication network 100 as an intermediate network. Such shared resource may be a bottle neck and e.g. a resource that may be overloaded first in case of heavy or certain type of data traffic to/from the multiple wireless devices, e.g. involving wireless devices 120-121, via the wireless communication network 100. This may e.g. be due to that a very large number of wireless devices access or attempt to access the multi-access communication network 100 using the shared resource, or attempt to access large amount of data at high bit rates.

Attention is drawn to that FIG. 1 is only schematic and for exemplifying purpose and that not everything shown in the figures may be required for all embodiments herein, as should be evident to the skilled person. Also, a communication system and wireless communication network that correspond(s) to the ones shown in the figure will typically comprise several further device, network nodes and details, as realized by the skilled person, but which are not shown herein for the sake of simplifying.

Figure 2:
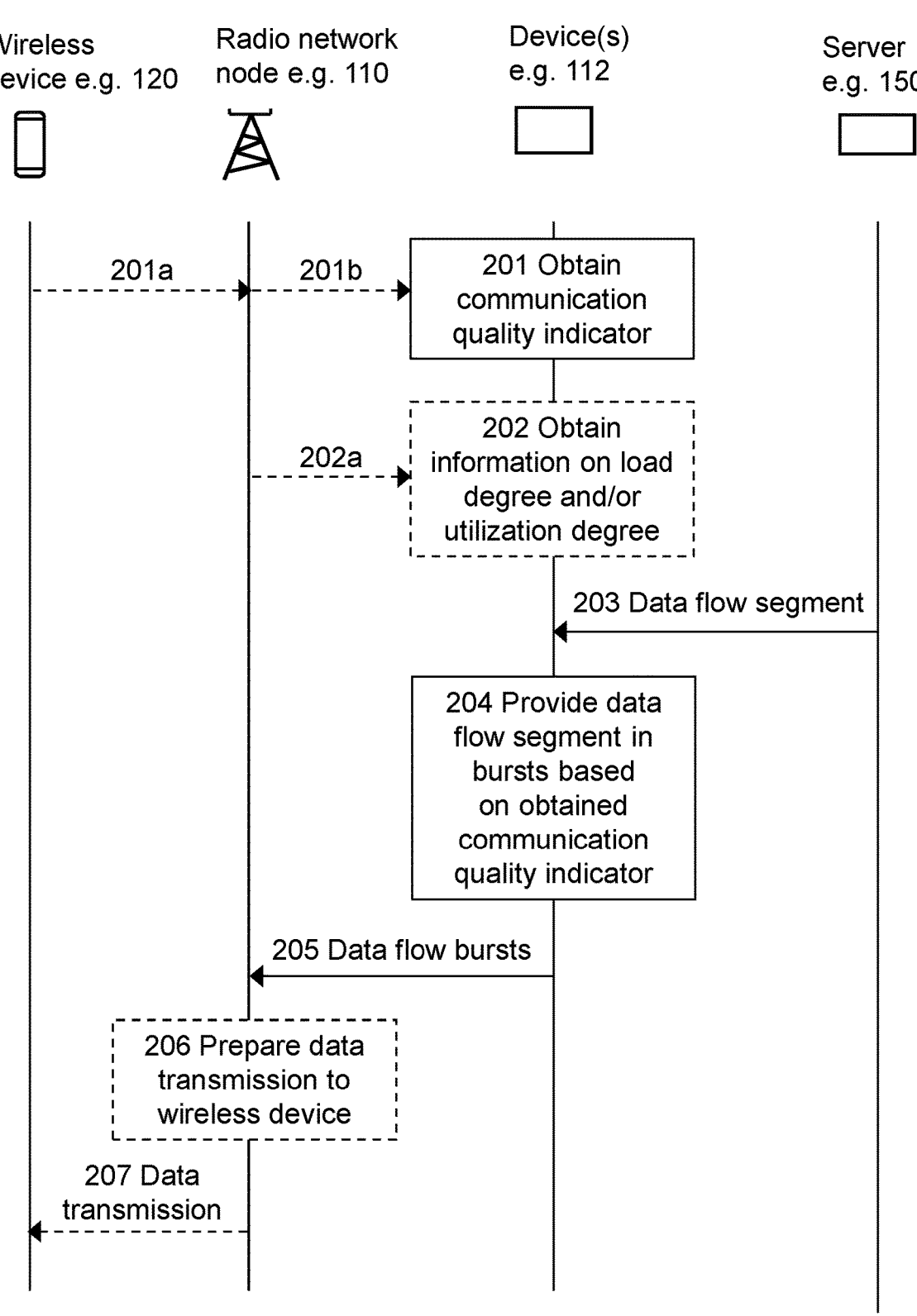
FIG. 2 depicts a combined signaling diagram and flowchart, to be used to discuss embodiments herein.

FIG. 2 depicts a combined signaling diagram and flowchart, which will be used to discuss embodiments herein.

The actions below, which may form one or more methods, relate to transmission of a data flow, e.g. the data flow 151, in bursts for transport in a wireless communication network, e.g. the wireless communication network 100, towards a wireless device, e.g. the wireless device 120, served by a radio network node, e.g. the radio network node 110, of the wireless communication network.

The actions below may be taken in any suitable order and/or be carried out fully or partly overlapping in time when this is possible and suitable.

Actions 201

One or more devices and/or nodes, i.e. device(s) and/or node(s), e.g. corresponding to the core network node 112, obtain a communication quality indictor indicating communication quality between the radio network node 110 and the wireless device 120, which communication quality is relevant for provision of the data flow 151 to the client device 120. Said device(s) and/or node(s) performing the present action are at least communicatively connected to the wireless communication network 100.

Said device(s) and/or node(s) performing the present action may be associated with the user plane, such as comprising or corresponding to node(s) providing or participating in a User Plane Function and/or Traffic Detection Function (UPF/TDF), or be UPF and/or PGW and/or TDF node(s) of the wireless communication network 100, i.e. typically by a core network node thereof, such as the core network node 112. Said device(s) and/or node(s) may be or comprise a network node configured to perform shaping of the data flow into said bursts for adaptation to the wireless communication network. More generally, said device(s) performing the present action may be devices(s) and/or node(s) involved in provision of data flows, such as the data flow 151, from an external source, via a wireless communication network to a wireless device, e.g. from the data providing device(s) 150 via the wireless communication network 100 to the wireless device 120.

As should be understood from the foregoing, said data flow and the bursts should be part of user plane traffic in the wireless communication network 100, and the data flow 151 may be relating to streamed data, e.g. streamed video data. The data flow 151 may thus comprise or be in the form of data segments, e.g. video segments, that may be provided by the data providing device(s) 150 according to adapted bitrate streaming over e.g. HTTP. The device(s) performing the present actions may be device(s) and/or node(s) involved in traffic shaping of data flows such as the data flow 151, e.g. by RFS, when it is transported in a wireless communication network, e.g. the wireless communication network 100.

Note that the present action, preferably is performed by a device and/or node involved in traffic shaping and that the data flow may pass through, e.g. the core network node 112 being a PGW node, but that the present action as well may be performed by other devices(s) and/or node(s), for example communicatively connected to the wireless communication network 100 and/or involved in traffic shaping, e.g. configured to control traffic shaping of e.g. a PGW node. In that case, the device(s) and/or node(s) performing the present action may in principle be located anywhere, e.g. in the CN 102, even the RAN 101, or external from the wireless communication network 100, e.g. be or comprise the remote device 141 and/or be part of or correspond to the remote computer network 14.

The communication quality indicator may be or be based on a Channel Quality Indicator (CQI) as discussed above. In some embodiments, the present action contains a sub-action 201a where the wireless device 120 transmits the CQI to the radio network node 110 that receives it. The CQI and how it is transmitted may be as conventionally and e.g. be part of that the wireless device 120 repeatedly provide CQIs to the wireless communication network 100. The received CQI, or relevant information thereof, may then in a sub-action 201b be sent to the device(s) and/or node(s) that perform the present action, e.g. the core network node 112, which thus obtains the CQI, or said relevant information thereof, by receiving it from the radio network node 110. The CQI or relevant information thereof, may thus be conveyed to the device(s) and/or node(s) performing the present action. Such information may be conveyed in different ways, e.g. in a GTP-U extension header or a user plane IP packet that may be intercepted by said device(s) and/or node(s).

In other embodiments, the CQI or relevant information thereof, or other kind of communication quality indictor, may be received from another device and/or node that may have received such indicator or corresponding information from the wireless device 120 and/or may have estimated and/or measured the communication quality between the wireless device 120 and the radio network node 110, and from this formed said other kind of communication quality indictor.

Note that in other embodiments, and e.g. dependent on which device(s) and/or node(s) that in a practical situation performs the present action, the communication quality indicator may be obtained internally by the device(s) and/or node(s) that performs the present action, e.g. computed based on estimates and/or measurements that in turn may have been be estimated and/or measured and/or obtained by the device(s) and/or node(s) performing the present action.

Action 202

Said device(s) and/or node(s) performing Action 201 may obtain indication on load degree and/or utilization degree of shared resource(s) involved in the provision of the data flow 151 to the wireless device 120. The shared resource may be such shared resource discussed above in connection with FIG. 1 and may be associated with the radio network node 110 and be a resource that may cause congestion in a cell where the radio network node 110 serves the wireless device 120. Note that it may be possible to obtain the information in the present action without actually knowing exactly which shared resource is involved. For example, if Round Trip Time (RTT) to and/or from the wireless device 120 is used as the indication, it may be assumed or even implied that the RTT will indicate load degree or utilization degree of one or more shared resources, although there occasionally could be other causes. In case of other indication than RTT, the indication could e.g. be received or obtained from a device comprising the shared resource, e.g. the radio network node 110 may provide and/or report load degree and/or utilization degree of the cell and/or resource(s) being used for serving the wireless device 120. Alternatives to using RTT for the indication of load degree and/or utilization degree, include information from one or more nodes configured to provide load and/or congestion information regarding said resource, e.g. node(s) of the RAN 101, Network Exposure Function (NEF) node(s), Operations Administration and Maintenance (OAM) node(s), etc.

Action 203

Said device(s) and/or node(s) performing Action 201 receives the data flow, such as a data flow segment thereof, e.g. a video segment. The received data flow, e.g. part of a streamed video service that may be transmitted vid adaptive bit rate, may be sent from a server, e.g. corresponding to the data providing device 150.

Action 204

Said device(s) and/or node(s) performing Action 201 provides the data flow, such as the received data flow segment, e.g. video segment, in Action 203 in bursts based on the obtained communication quality indicator.

Said burst may be based on the obtained communication quality indicator, e.g. CQI, in that the bursts are formed, shaped and/or adapted based on the obtained communication quality indicator. Further details and examples of how the bursts may be based on the obtained communication quality indictor is discussed separately below in connection with FIG. 3.

Thanks to provision of the data flow 151 to the wireless device 120 with said bursts based on the obtained communication quality indicator, burst may be tuned better and efficiency increase. By being based on the communication quality indicator, e.g. CQI, the bursts can be adapted to take communication conditions for individual wireless devices into account, in contrast to conventional RFS where bursts use a common burst size for wireless devices at different communication quality, e.g. radio, conditions. If this is combined with congestion aware traffic shaping, further and even vast efficiency gains, particularly in heavily loaded cells, are enabled.

The improved efficiency mean better utilized resources for delivering data flows, in particular e.g. video data, resulting in that more users can be delivered such data and/or at better quality. It will e.g. be possible to deliver higher quality video streaming services to users connected via wireless communication networks.

In some embodiments, the bursts are based on the obtained communication quality indicator in response to a certain load degree of a shared resource involved in said provision of the data flow 151, e.g. according to the information on load degree and/or utilization degree as obtained in Action 202. Said shared resource may be as discussed above. Said certain load degree may be an indication of congestion relating to said shared resource. For example, said certain load degree may be a predefined or predetermined load degree. How the obtained information on load degree relates to this may determine if there is considered to be a situation of congestion or not. The indication of congestion may be of actual congestion or of that congestion is close to occur. In some embodiments, the bursts may only be based on the obtained communication quality indicator if there is a certain load degree, e.g. indication of congestion, else the bursts may be provided as conventionally, e.g. according to a first shaping function as discussed below in connection with FIG. 3.

Further, in some embodiments, the bursts may be formed based on the obtained communication quality indicator in response to a certain communication quality level indicated by the obtained communication quality indicator. For example, embodiments herein may be applied only for wireless devices that are associated with certain low CQI values, e.g. below a certain CQI reference value. In these embodiments only "low CQI" and/or "bad radio condition" wireless devices served by the radio node 110 may be subject for embodiments herein. Burst may thus be formed as conventionally but target "high CQI" wireless devices without tradeoff due to "bad condition" wireless devices since the "bad condition" wireless devices may be taken care of by having their bursts formed, and e.g. adapted, based on the obtained communication quality indicator. This may be combined with the above, where it for example first may be checked if there is or a risk for congestion, e.g. RTT greater than a predefined congestion limit value, and if so, then bursts are based on the obtained communication quality indicator if the obtained communication quality indicator indicates that the wiles device is a "low CQI" wireless device.

Similar as under action 202, said certain load degree may be based on one or more of the following: RTT associated with the data flow, information from one or more nodes configured to provide load and/or congestion information regarding said resource, e.g. node(s) of the RAN 101, NEF node(s), OAM node(s), etc.

Action 205

The provided bursts of Action 204, i.e. of the data flow, including e.g. the data flow segment, such as video segment, are transmitted to the radio network node 110 serving the wireless communication device 120, e.g. in a cell, for further transmission towards the wireless communication device 120. The radio network node 110 receives the transmission.
Action 206

The radio network node 110 prepares data transmission to the wireless device based on the received data flow bursts. Received data is scheduled for wireless transmission according to the RAT, e.g. LTE/4G or R/5G, that the radio network node 110 and the wireless device 120 operates in accordance with. The preparation may include that the received burst together with received data for transmission to other wireless devices, e.g. the wireless device 121, are prepared for transmission at the same or very close in time. Received data for transmission to wireless devices may need to be buffered by the radio network node 110 to some extent before it is scheduled and transmitted. The radio network node, or a scheduler or scheduling function thereof, may, thanks to the nature of the bursts and that they are based on radio conditions at wireless device, and that similar may apply for other served wireless devices, be able to more efficiently utilize a shared resource with limited capacity for transmitting wirelessly. The limited capacity corresponds to a limit in total data bitrate that can be simultaneously transmitted and shared between served wireless devices and may be due to bandwidth limitations associated with the RAT in use. Since received data bursts thanks to embodiments herein may already take into account radio conditions at individual wireless devices and be adapted to these, it is enabled more efficient sharing and utilization of the total available bit rate when scheduling data for transmission to the wireless devices, with less risk that some wireless devices at "good radio conditions" become served with lower bit rate than needed and e.g. lower service and/or video quality, and other "bad radio condition" wireless devices become served with data at higher rates than they actually need or can benefit from.
Action 207

The data transmission prepared in Action 206 is wirelessly transmitted to the wireless devices 120 as part of a uplink transmission by the radio network node 110 e.g. according to how data has been scheduled.

Figure 3:
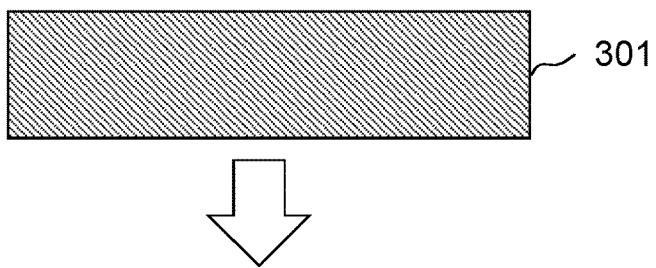
FIG. 3 schematically illustrates two examples of how data can be transmitted in data bursts based on embodiments herein.
Figure 3:
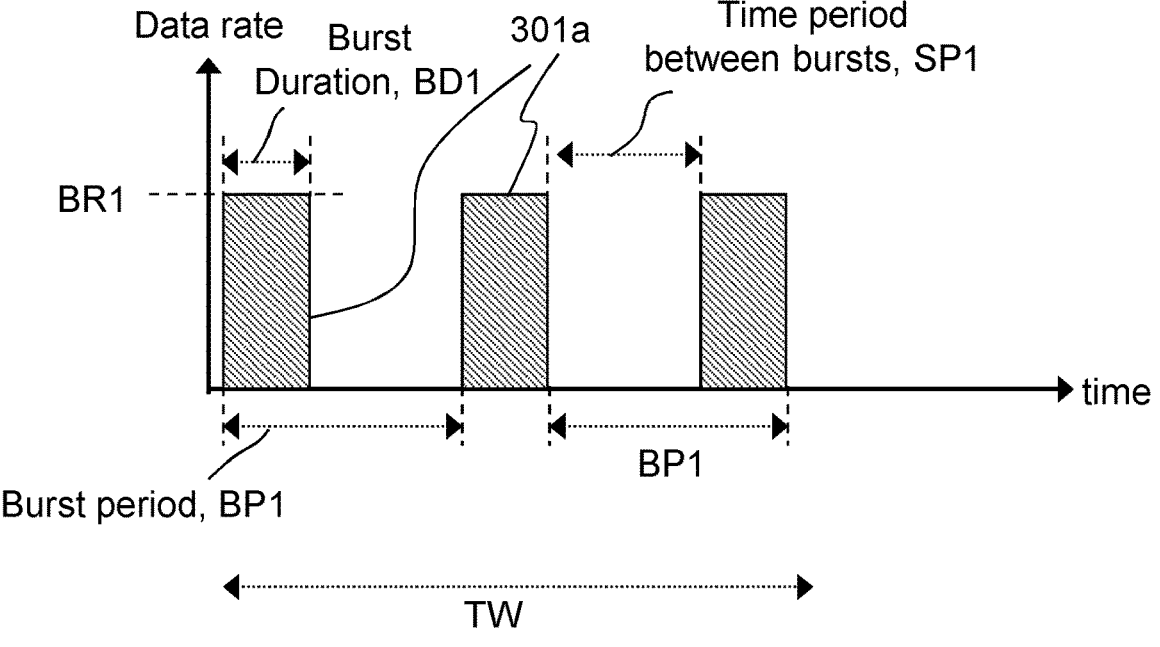
Figure 3:
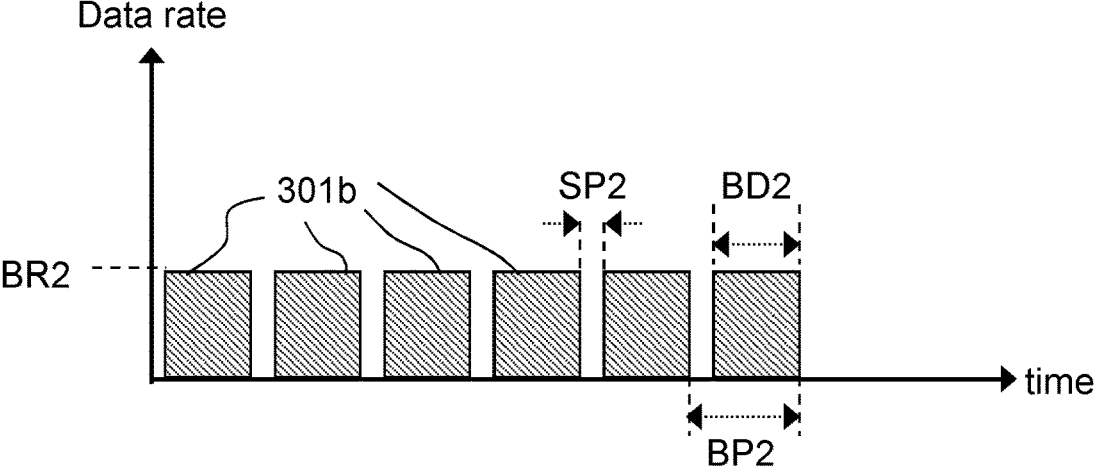

FIG. 3 schematically illustrates two examples of how data can be transmitted in data bursts based on embodiments herein. Embodiments herein will in the following be discussed in relation to both FIG. 2 and FIG. 3.

A data flow segment 301, e.g. a video segment, as discussed above in connection with FIG. 2 is in a first example split into bursts 301*a* and is in a second example split into bursts 301*b*. The data flow segment may thus be part of the data flow 151.

In the first example there are 3 bursts 301*a*, each at a bit rate BR1, a burst duration BD1, and a silence period SP1, i.e. a time period, between bursts. The result is burst period BP1. The bursts 301*a* occur under a time window TW.

Correspondingly there is in the second example with 6 bursts but at a bitrate BR2 that is lower than BR1 in the first example. Each burst 301*b* being exemplified as half the size of the bursts of the first example, but with a burst duration BD2 that is approximately the same as BD1 of the first example. The bursts 301*b* occur in the second example within the same time window TW. Further, the bursts 301*b* in the second example occur more frequently, with a burst period BP2 that is shorter than BP1 and with a shorter silence period SP2 between the bursts than SP1 in the first example.

As mention above, in embodiments herein, bursts of the dataflow 151 and e.g. the data segment 301, directed to a wireless device, e.g. the wireless device 120, are based on said obtained communication quality indicator, e.g. CQI, for the wireless device.

The first example may be burst as they would look like with conventional RBS or resulting from embodiments herein when the wireless device 120 is in at a certain first communication quality condition, e.g. in "good radio condition" such as indicated by a "high CQI". The second example may then be when the bursts are based on the obtained communication quality indicator and that in comparison with the first example indicates a decrease in the communication quality, e.g. due to that radio conditions has become worse.

In general, in case of "low communication quality" for a wireless device, e.g. "low CQI" and/or "bad radio condition", such as CQI<7, it is desirable with bursts of reduced size, i.e. data amount per burst, typically by lowering bit rate and transmitting burst more frequent, compared to when communication quality is better or good, such as CQI>10. With given circumstances, network specs, RAT etc. It is within the capacity of the skilled person to in greater detail find out how bursts suitably should be modified and/or should look like based on embodiments herein in a certain context. For example by designing said second shaping functionality mentioned below or how an existing shaping functionality may be modified.

Embodiments herein may be integrated with or made operate with existing, e.g. conventional, traffic shaping, e.g. RBS, functionality.

Said provision of the data flow 151 in bursts, e.g. bursts 301*a* and/or 301*b*, may thus involve a first data flow shaping functionality for providing bursts and that may be based on or correspond to a conventional such functionality. The first data flow shaping functionality may further e.g. be based on indication of load degree of a resource common for multiple wireless devices, e.g. for the wireless devices 120, 121, i.e. shared by, when served by the radio network node 110. This may e.g. be a resource relating to the radio network node 110 and that may cause congestion when serving said wireless device in a cell and which shared resource is involved in said provision of the data flow 151 to the wireless device 120. That is, the first functionality may be congestion based, e.g. based on RTT or similar as discussed above.

Said provision of the data flow 151 in bursts may further involve a second shaping functionality that is based on said obtained communication quality indicator and that may control of affect the first shaping functionality and/or the bursts it provides. The first shaping functionality may be a functionality independent on the second and e.g. correspond to a conventional shaping functionality as discussed above. The second shaping functionality may operate on output from the first shaping functionality and/or control the first shaping functionality and how bursts are formed.

The first data flow shaping functionality could e.g. result in burst as in the first example of FIG. 3 for the wireless device 120 and the second data flow shaping functionality in modified bursts that look like in the second example of FIG. 3 when also communication quality or the wireless device 120 is taken into account and bursts adapted in view of this.

In some embodiments there is instead only provided a single shaping functionality that in all or in some circumstances provide bursts based on said obtained communication quality indicator, e.g. CQI, for the wireless device.

Hence, that the bursts are based on the obtained communication quality indicator may comprise that a bit rate, e.g. BR2, of the bursts, e.g. bursts 301*b*, is based on the obtained communication quality indicator. The bursts may be based on the obtained communication quality indicator such that
when the obtained communication quality indicator, e.g.
CQI, indicates a decrease in the communication quality, this
has an effect of decreasing the bit rate, e.g. from BR1 to
BR2.

It may also be that the bursts are based on the obtained
communication quality indicator comprises that a data
amount of each burst, i.e. burst size, is based on the obtained
communication quality indicator. The data amount of the
bursts may e.g. be based on the obtained communication
quality indicator such that when the obtained communica-
tion quality indicator indicates a decrease in the communi-
cation quality, this has an effect of decreasing the data
amount carried by each burst. The data amount carried by a
burst 301*a* results from the bitrate BR1 and the burst
duration BD1, and of a burst 301*b* by the bitrate BR2 and the
burst duration BD2.

Further, that the bursts are based on the obtained com-
munication quality indicator may comprises that time peri-
ods between individual bursts, such as silence periods SP2,
are based on the obtained communication quality indicator.
The time periods between the individual bursts may be
based on the obtained communication quality indicator such
that when the obtained communication quality indicator
indicates a decrease in the communication quality, this has
an effect of decreasing the time periods, e.g. from SP1 to
SP2. That is, more frequently occurring bursts.

The burst affecting effects mentioned may be provided by
a shaping function, e.g. the second shaping function men-
tioned above or a shaping function modified to implement
embodiments herein.

Figure 4:
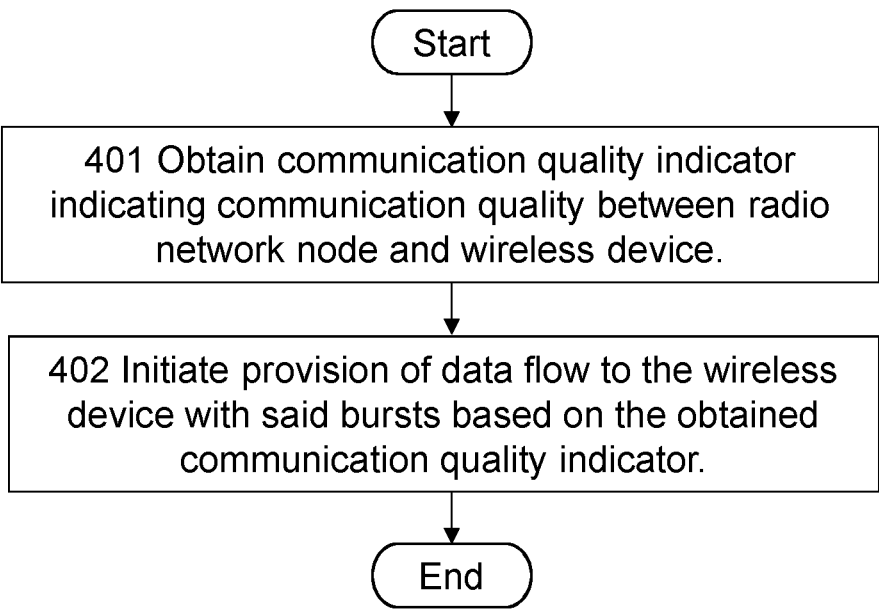
FIG. 4 is a flowchart schematically illustrating embodiments of a first method according to embodiments herein.

FIG. 4 is a flowchart schematically illustrating embodi-
ments of a first method according to embodiments herein.

The method may be performed by one or more devices,
e.g. by the core network 102 or network node(s) thereof such
as the core network node 112, the remote computer network
130 and/or the remote device 131. The method relates to,
e.g. is for, transmission of a data flow, e.g. the data flow 151,
in bursts, e.g. bursts 301*a* and/or 301*b*, for transport in a
wireless communication network, e.g. the wireless commu-
nication network 100, towards a wireless device, e.g. the
wireless device 120, served by a radio network node, e.g. the
radio network node 110, of said wireless communication
network 100. The one or more devices being communica-
tively connected to the wireless communication network
100.

The actions below may be taken in any suitable order
and/or be carried out fully or partly overlapping in time
when this is possible and suitable.

Action 401

Said one or more devices obtains a communication qual-
ity indicator indicating communication quality between the
radio network node 110 and the wireless device 120, which
communication quality is relevant for provision of the data
flow 151 to the wireless device 120.

The communication quality indicator may be based on a
CQI.

The present action may fully or partly correspond to
Action 201 discussed above in relation to FIG. 2.

Action 402

Said one or more devices initiate provision of said data
flow 151 to the wireless device 120 with said bursts 301*b*
based on the obtained communication quality indicator.

Initiate provision of the data flow with said bursts to the
wireless device 120 may include to control, e.g. by control-
ling and/or sending information instructing another device
or node to provide the data flow by e.g. performing or participating in the transmission as such. In other embodi-
ments, initiating the provision may simply be that said
device(s) and/or node(s) performing the present action is
providing the data flow with said bursts, and thereby also
initiates the transmission, such as described in connection
with FIG. 2.

Said bursts 301*b* based on the obtained communication
quality indicator may comprise that a bit rate, e.g. BR2, of
the bursts 301*b*, is based on the obtained communication
quality indicator. The bit rate may be based on the obtained
communication quality indicator such that when the
obtained communication quality indicator indicates a
decrease in the communication quality, this has an effect of
decreasing the bit rate.

Further, said bursts 301*b* based on the obtained commu-
nication quality indicator may comprise that a data amount
of each burst 301*b* is based on the obtained communication
quality indicator. The data amount of each burst 301*b* may
be based on the obtained communication quality indicator
such that when the obtained communication quality indica-
tor indicates a decrease in the communication quality, this
has an effect of decreasing the data amount carried by each
burst 301*b*.

Moreover, the bursts 301*b* may be based on the obtained
communication quality indicator comprises that time peri-
ods between individual bursts 301*b* are based on the
obtained communication quality indicator. The time periods
between the individual bursts 301*b* may be based on the
obtained communication quality indicator such that when
the obtained communication quality indicator indicates a
decrease in the communication quality, this has an effect of
decreasing the time periods.

In some embodiments, the bursts 301*b* are based on the
obtained communication quality indicator in response to a
certain load degree of a shared resource involved in said
provision of the data flow 151. Said certain load degree may
be an indication of congestion relating to said shared
resource. Said certain load degree may further be based on
one or more of the following: RTT associated with the data
flow 151 and information from one or more nodes config-
ured to provide load and/or congestion information regard-
ing said resource.

Moreover, in some embodiments, the bursts 301*b* are
formed based on the obtained communication quality indi-
cator in response to a certain communication quality level
indicated by the obtained communication quality indicator.

The present action may fully or partly correspond to
Actions 203-205 discussed above in relation to FIG. 2.

Figure 5:
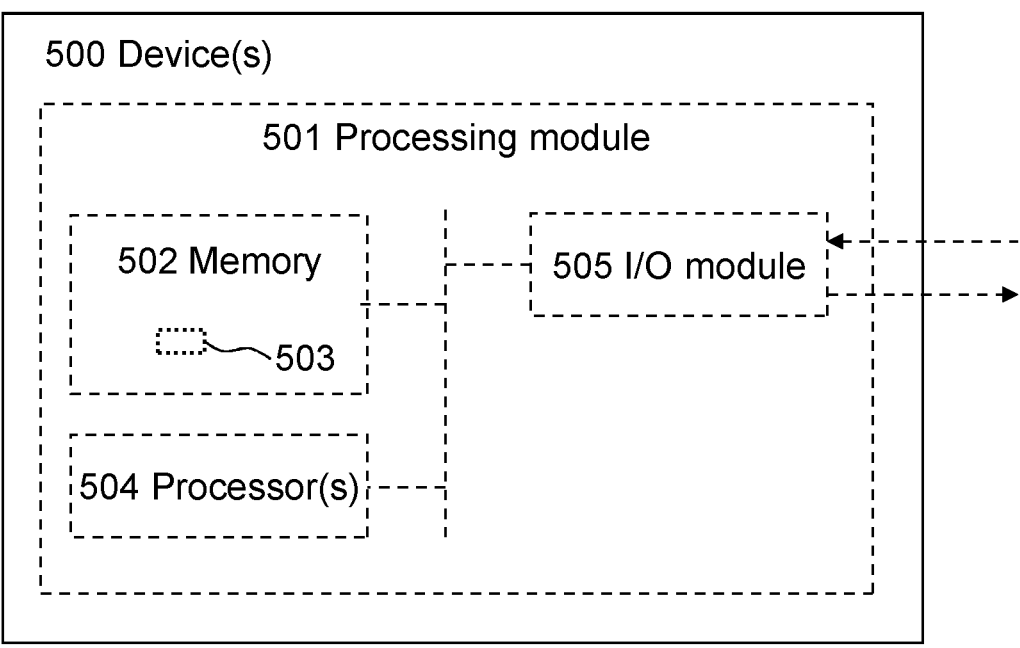
FIG. 5 is a schematic block diagram for illustrating embodiments of how one or more devices may be configured to perform the first method.

FIG. 5 is a schematic block diagram for illustrating
embodiments of how one or more devices 500, e.g. said one
or more devices discussed above in connection with FIG. 4,
including e.g. the core network node 112, may be configured
to perform the method and actions discussed above in
connection with FIG. 4.

Hence, the device(s) 500 relates to, e.g. is for, transmis-
sion of a data flow, e.g. the data flow 151, in bursts, e.g.
bursts 301*a* and/or 301*b*, for transport in a wireless com-
munication network, e.g. the wireless communication net-
work 100, towards a wireless device, e.g. the wireless device
120, served by a radio network node, e.g. the radio network
node 110, of said wireless communication network 100. The
one or more devices being configured to be communica-
tively connected to the wireless communication network
100.

The device(s) 500 may comprise a processing module
501, such as a means, one or more hardware modules, including e.g. one or more processors, and/or one or more software modules for performing said method and/or actions.

The device(s) 500 may further comprise memory 502 that may comprise, such as contain or store, a computer program 503. The computer program 503 comprises 'instructions' or 'code' directly or indirectly executable by the device(s) 500 to perform said method and/or actions. The memory 502 may comprise one or more memory units and may further be arranged to store data, such as configurations and/or applications involved in or for performing functions and actions of embodiments herein.

Moreover, the device(s) 500 may comprise a processor(s) 504, i.e. one or more processors, as exemplifying hardware module(s) and may comprise or correspond to one or more processing circuits. In some embodiments, the processing module(s) 501 may comprise, e.g. 'be embodied in the form of' or 'realized by' processor(s) 504. In these embodiments, the memory 502 may comprise the computer program 503 executable by the processor(s) 504, whereby the device(s) 600 is operative, or configured, to perform said method and/or actions thereof.

Typically the device(s) 500, e.g. the processing module(s) 501, comprises Input/Output (I/O) module(s) 505, such as circuitry, configured to be involved in, e.g. by performing, any communication to and/or from other units and/or devices, such as sending and/or receiving information to and/or from other devices, e.g. receiving from the server device 130 and sending towards wireless device 120 and e.g. the radio network node 110. The I/O module(s) 505 may be exemplified by obtaining, e.g. receiving, module(s) and/or providing, e.g. sending, module(s), when applicable.

Further, in some embodiments, the device(s) 500, e.g. the processing module(s) 501, comprises one or more of obtaining module(s), initiating module(s), providing module(s), as exemplifying hardware and/or software module(s) for carrying out actions of embodiments herein. These modules may be fully or partly implemented by the processor(s) 504.

The device(s) 500, and/or the processing module(s) 501, and/or the processor(s) 504, and/or the I/O module(s) 505, and/or the obtaining module(s) may thus be operative, or configured, to obtain said communication quality indicator.

Further, the device(s) 500, and/or the processing module(s) 501, and/or the processor(s) 504, and/or the I/O module(s) 505, and/or the initiating module(s) may be operative, or configured, to initiate said provision of said data flow 151 to the wireless device 120 with said bursts based on the obtained communication quality indicator.

Figure 6:
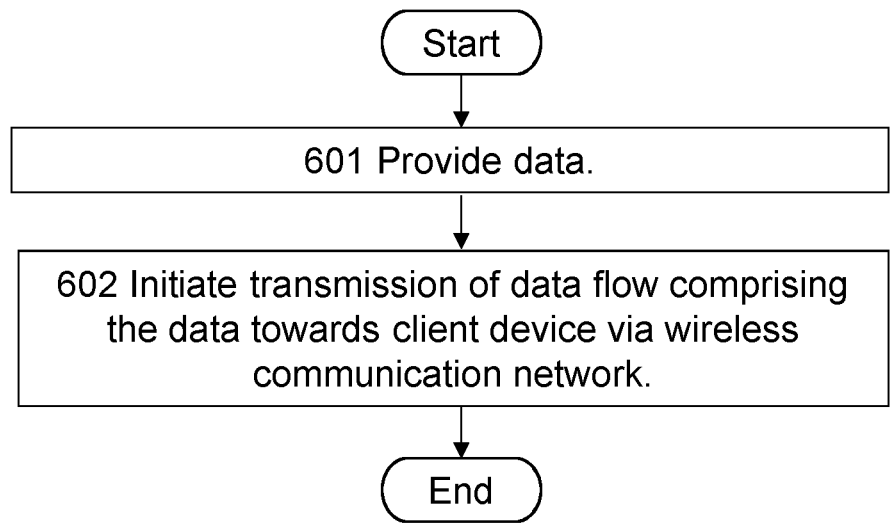
FIG. 6 is a flowchart schematically illustrating embodiments of a second method according to embodiments herein.

FIG. 6 is a flowchart schematically illustrating embodiments of a second method according to embodiments herein. The method may be performed by a data providing device, e.g. the data providing device 150. The method relates to, e.g. is for, transmission of a data flow, e.g. the data flow 151 towards a wireless device, e.g. the wireless device 120.

The actions below may be taken in any suitable order and/or be carried out fully or partly overlapping in time when this is possible and suitable.

Action 601

The data providing device 150 provides data for transport by the data flow 150.

This action may correspond to that a service provider provides data, e.g. video data, available for access over the Internet on e.g. server device(s) corresponding to the data providing device 150.

Action 602

The data providing device initiates transmission of the data flow 151 comprising the provided data towards the towards the wireless device 120 via a wireless communication network, e.g. the wireless communication network 100, to which one or more devices are communicatively connected. Said one or more devices may correspond to the device(s) 500 and thus e.g. the core network 102 or network node(s) thereof such as the core network node 112, the remote computer network 130 and/or the remote device 131. Said one or more devices thus relate to transmission of the data flow 151 in bursts, e.g. 301b, for transport in the wireless communication network 100 towards the wireless device 120 served by a radio network node, e.g. the radio node 110, of said wireless communication network 100. Said one or more devices being configured to obtain a communication quality indicator as above, i.e. indicating communication quality between the radio network node 110 and the wireless device 120, which communication quality is relevant for provision of the data flow to the wireless device 120. Said device(s) further being configured to initiate provision of said data flow 151 to the wireless device 120 with said bursts 301b based on the obtained communication quality indicator.

When data providing device 150 performs the second method, e.g. for delivering a video streaming service to the wireless device 120, advantages include better utilized resources for delivering data flows, in particular e.g. video data, resulting in that more users can be delivered such data and/or at better quality. It will e.g. be possible to deliver higher quality video streaming services to users connected via wireless communication networks, e.g. the wireless communication network 100.

Figure 7:
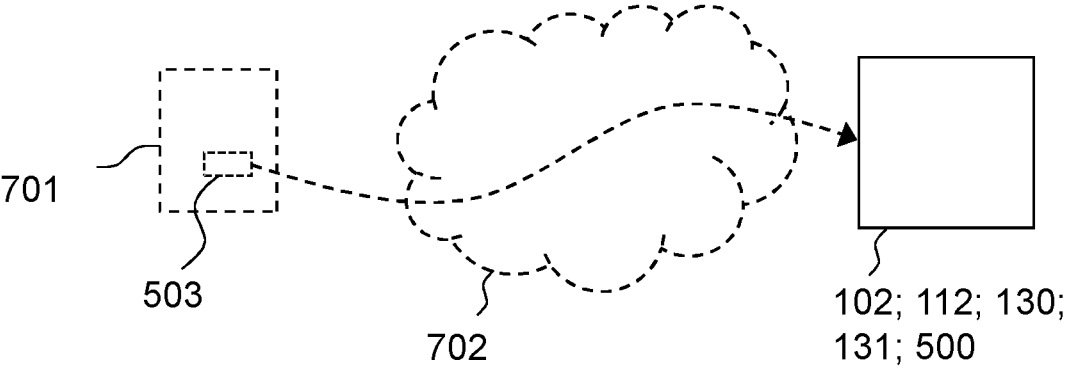
FIG. 7 is a schematic drawing illustrating some embodiments relating to computer program and carriers thereof to cause device(s) to perform said first method and related actions.

FIG. 7 is a schematic drawing illustrating some embodiments relating to computer program and carriers thereof to cause said device(s) 500 discussed above to perform said first method and related actions. The computer program may be the computer program 503 and comprises instructions that when executed by the processor(s) 504 and/or the processing module(s) 501, cause the device(s) 500 to perform as described above. In some embodiments there is provided a carrier, or more specifically a data carrier, e.g. a computer program product, comprising the computer program. The carrier may be one of an electronic signal, an optical signal, a radio signal, and a computer readable storage medium, e.g. a computer readable storage medium 701 as schematically illustrated in the figure. The computer program 503 may thus be stored on the computer readable storage medium 701. By carrier may be excluded a transitory, propagating signal and the data carrier may correspondingly be named non-transitory data carrier. Non-limiting examples of the data carrier being a computer readable storage medium is a memory card or a memory stick, a disc storage medium such as a CD or DVD, or a mass storage device that typically is based on hard drive(s) or Solid State Drive(s) (SSD). The computer readable storage medium 801 may be used for storing data accessible over a computer network 702, e.g. the Internet or a Local Area Network (LAN). The computer program 503 may furthermore be provided as pure computer program(s) or comprised in a file or files. The file or files may be stored on the computer readable storage medium 701 and e.g. available through download e.g. over the computer network 802 as indicated in the figure, e.g. via a server. The server may e.g. be a web or File Transfer Protocol (FTP) server. The file or files may e.g. be executable files for direct or indirect download to and execution on said device(s) 500 to make it perform as described above, e.g. by execution by the processor(s) 504. The file or files may also or alternatively be for intermediate download and compilation involving the same or another processor(s) to make them executable before further download and execution causing said device(s) 500 to perform as described above.

Note that any processing module(s) and circuit(s) mentioned in the foregoing may be implemented as a software and/or hardware module, e.g. in existing hardware and/or as an Application Specific Integrated Circuit (ASIC), a field-programmable gate array (FPGA) or the like. Also note that any hardware module(s) and/or circuit(s) mentioned in the foregoing may e.g. be included in a single ASIC or FPGA, or be distributed among several separate hardware components, whether individually packaged or assembled into a System-on-a-Chip (SoC).

Those skilled in the art will also appreciate that the modules and circuitry discussed herein may refer to a combination of hardware modules, software modules, analogue and digital circuits, and/or one or more processors configured with software and/or firmware, e.g. stored in memory, that, when executed by the one or more processors may make the node(s) and device(s) to be configured to and/or to perform the above-described methods and actions.

Identification by any identifier herein may be implicit or explicit. The identification may be unique in a certain context, e.g. in the wireless communication network or at least in a relevant part or area thereof.

The term "network node" or simply "node" as used herein may as such refer to any type of node that may communicate with another node in and be comprised in a communication network, e.g. IP network or wireless communication network. Further, such node may be or be comprised in a radio network node (described below) or any network node, which e.g. may communicate with a radio network node. Examples of such network nodes include any radio network node, a core network node, Operations & Maintenance (O&M), Operations Support Systems (OSS), Self Organizing Network (SON) node, etc.

The term "radio network node" as may be used herein may as such refer to any type of network node for serving a wireless communication device, e.g. a so called User Equipment or UE, and/or that are connected to other network node(s) or network element(s) or any radio node from which a wireless communication device receives signals from. Examples of radio network nodes are Node B, Base Station (BS), Multi-Standard Radio (MSR) node such as MSR BS, eNB, eNodeB, gNB, network controller, RNC, Base Station Controller (BSC), relay, donor node controlling relay, Base Transceiver Station (BTS), Access Point (AP), New Radio (NR) node, transmission point, transmission node, node in distributed antenna system (DAS) etc.

Each of the terms "wireless communication device", "user equipment" and "UE", as may be used herein, may as such refer to any type of wireless device arranged to communicate with a radio network node in a wireless, cellular and/or mobile communication system, and may thus be referred to as a wireless communication device. Examples include: target devices, device to device UE, device for Machine Type of Communication (MTC), machine type UE or UE capable of machine to machine (M2M) communication, Personal Digital Assistant (PDA), Tablet, mobile, terminals, smart phone, Laptop Embedded Equipment (LEE), Laptop Mounted Equipment (LME), Universal Serial Bus (USB) dongles etc.

While some terms are used frequently herein for convenience, or in the context of examples involving other a certain, e.g. 3GPP or other standard related, nomenclature, it must be appreciated that such term as such is non-limiting Also note that although terminology used herein may be particularly associated with and/or exemplified by certain communication systems or networks, this should as such not be seen as limiting the scope of the embodiments herein to only such certain systems or networks etc.

As used herein, the term "memory" may refer to a data memory for storing digital information, typically a hard disk, a magnetic storage, medium, a portable computer diskette or disc, flash memory, Random Access Memory (RAM) or the like. Furthermore, the memory may be an internal register memory of a processor.

Also note that any enumerating terminology such as first device or node, second device or node, first base station, second base station, etc., should as such be considered non-limiting and the terminology as such does not imply a certain hierarchical relation. Without any explicit information in the contrary, naming by enumeration should be considered merely a way of accomplishing different names.

As used herein, the expression "configured to" may mean that a processing circuit is configured to, or adapted to, by means of software or hardware configuration, perform one or more of the actions described herein.

As used herein, the terms "number" or "value" may refer to any kind of digit, such as binary, real, imaginary or rational number or the like. Moreover, "number" or "value" may be one or more characters, such as a letter or a string of letters. Also, "number" or "value" may be represented by a bit string.

As used herein, the expression "may" and "in some embodiments" has typically been used to indicate that the features described may be combined with any other embodiment disclosed herein.

In the drawings, features that may be present in only some embodiments are typically drawn using dotted or dashed lines.

As used herein, the expression "transmit" and "send" are typically interchangeable. These expressions may include transmission by broadcasting, uni-casting, group-casting and the like. In this context, a transmission by broadcasting may be received and decoded by any authorized device within range. In case of unicasting, one specifically addressed device may receive and encode the transmission. In case of group-casting, e.g. multicasting, a group of specifically addressed devices may receive and decode the transmission.

When using the word "comprise" or "comprising" it shall be interpreted as nonlimiting, i.e. meaning "consist at least of".

The embodiments herein are not limited to the above described embodiments. Various alternatives, modifications and equivalents may be used. Therefore, the above embodiments should not be taken as limiting the scope of the present disclosure, which is defined by the appending claims.

The invention claimed is:

1. A method, performed by one or more devices comprised in a core network part of a wireless communication network, relating to transmission of a segment of data in a data flow in a plurality of bursts for transport in said wireless communication network towards a wireless device served by a radio network node of said wireless communication network, said one or more devices being communicatively connected to the wireless communication network, the method comprising:

obtaining a communication quality indicator indicating communication quality between the radio network node and the wireless device, wherein the communication quality indicator is based on a Channel Quality Indicator (CQI), which communication quality is relevant for provision of the data flow to the wireless device; and initiating provision of said segment of data into the data flow to the wireless device within said plurality of bursts based on the obtained communication quality indicator, wherein the communication quality indicator is used to determine a number of the plurality of bursts, bit rate of each burst, and a time period between each of the plurality of bursts, to complete transmission of the data flow to the wireless device within a given time window and in which a burst duration of each burst is maintained approximately same, wherein the plurality of bursts are based on the obtained communication quality indicator in response to a certain load degree of a shared resource involved in said provision of the data flow.

2. The method as claimed in claim 1, wherein when the obtained communication quality indicator indicates a decrease in the communication quality, decreasing the bit rate of each burst.

3. The method as claimed in claim 1, wherein when the obtained communication quality indicator indicates a decrease in the communication quality, decreasing an amount of data carried by each burst.

4. The method as claimed in claim 1, wherein when the obtained communication quality indicator indicates a decrease in the communication quality, decreasing the time period between each burst.

5. The method as claimed in claim 1, wherein said certain load degree is an indication of congestion relating to said shared resource.

6. The method as claimed in claim 1, wherein said certain load degree is based on one or more of: Round Trip Time (RTT) associated with the data flow, information from one or more nodes to provide information on load, congestion, or both load and congestion, regarding said shared resource.

7. A non-transitory computer-readable storage medium containing a computer program comprising instructions that, when executed by one or more processors, cause one or more devices in a core network part of a wireless communication network relating to transmission of a segment of data in a data flow in a plurality of bursts for transport in said wireless communication network towards a wireless device served by a radio network node of said wireless communication network, said one or more devices being communicatively connected to the wireless communication network to perform operations comprising:

obtaining a communication quality indicator indicating communication quality between the radio network node and the wireless device, wherein the communication quality indicator is based on a Channel Quality Indicator (CQI), which communication quality is relevant for provision of the data flow to the wireless device; and initiating provision of said segment of data into the data flow to the wireless device within said plurality of bursts based on the obtained communication quality indicator, wherein the communication quality indicator is used to determine a number of the plurality of bursts, bit rate of each burst, and a time period between each of the plurality of bursts, to complete transmission of the data flow to the wireless device within a same time window and in which a burst duration of each burst is maintained approximately same, wherein the plurality of bursts are based on the obtained communication quality indicator in response to a certain load degree of a shared resource involved in said provision of the data flow.

8. One or more devices comprised in a core network part of a wireless communication network relating to transmission of a segment of data in a data flow in a plurality of bursts for transport in said wireless communication network towards a wireless device served by a radio network node of said wireless communication network, said one or more devices being communicatively connected to the wireless communication network, wherein said one or more devices comprising:

one or more processors; and a memory comprising instructions which, when executed by the one or more processors, cause the one or more devices to:

obtain a communication quality indicator indicating communication quality between the radio network node and the wireless device, wherein the communication quality indicator is based on a Channel Quality Indicator (CQI), which communication quality is relevant for provision of the data flow to the wireless device; and initiate provision of said segment of data into the data flow to the wireless device within said plurality of bursts based on the obtained communication quality indicator, wherein the communication quality indicator is used to determine a number of the plurality of bursts, bit rate of each burst, and a time period between each of the plurality of bursts, to complete transmission of the data flow to the wireless device within a same time window and in which a burst duration is maintained approximately same, wherein the plurality of bursts are based on the obtained communication quality indicator in response to a certain load degree of a shared resource involved in said provision of the data flow.

9. The one or more devices as claimed in claim 8, wherein when the obtained communication quality indicator indicates a decrease in the communication quality, decrease the bit rate of each burst.

10. The one or more devices as claimed in claim 8, wherein when the obtained communication quality indicator indicates a decrease in the communication quality, decrease an amount of data carried by each burst.

11. The one or more devices as claimed in claim 8, wherein when the obtained communication quality indicator indicates a decrease in the communication quality, decrease the time period between each burst.

12. The one or more devices as claimed in claim 8, wherein said certain load degree is an indication of congestion relating to said shared resource.

13. The one or more devices as claimed in claim 8, wherein said certain load degree is based on one or more of: Round Trip Time (RTT) associated with the data flow, information from one or more nodes to provide information of load, congestion, or both load and congestion, regarding said shared resource.

14. A method, performed by a data providing device, relating to transmission of a segment of data in a data flow in a plurality of bursts towards a wireless device, the method comprising:

providing the segment of data to be transported by the data flow; and initiating transmission of the segment of data into the data flow towards the wireless device via a wireless communication network to which one or more devices are communicatively connected for transmission of the data flow in the plurality of bursts for transport in the wireless communication network towards the wireless device that is served by a radio network node of said wireless communication network, wherein said one or more devices are to obtain a communication quality indicator indicating communication quality between the radio network node and the wireless device based on a Channel Quality Indicator (CQI), which communication quality is relevant for provision of the data flow to the wireless device, and to initiate provision of said segment of data into the data flow to the wireless device within said plurality of bursts based on the obtained communication quality indicator, wherein the communication quality indicator is used to determine a number of the plurality of bursts, bit rate of each burst, and a time period between each of the plurality of bursts, to complete transmission of the data flow to the wireless device within a same time window and in which a burst duration of each burst is maintained approximately same, wherein the plurality of bursts are based on the obtained communication quality indicator in response to a certain load degree of a shared resource involved in said provision of the data flow.

15. The non-transitory computer-readable storage medium as claimed in claim 7, wherein when the obtained communication quality indicator indicates a decrease in the communication quality, decreasing the bit rate of each burst.

16. The non-transitory computer-readable storage medium as claimed in claim 7, wherein when the obtained communication quality indicator indicates a decrease in the communication quality, decreasing an amount of data carried by each burst.

17. The non-transitory computer-readable storage medium as claimed in claim 7, wherein when the obtained communication quality indicator indicates a decrease in the communication quality, decreasing the time period between each burst.

* * * * *